Feb. 7, 1967 J. HENCHERT ETAL 3,302,826
PLASTIC HANDLE AND CLEAT ATTACHMENT FOR CONTAINERS
Original Filed March 30, 1961 3 Sheets-Sheet 1
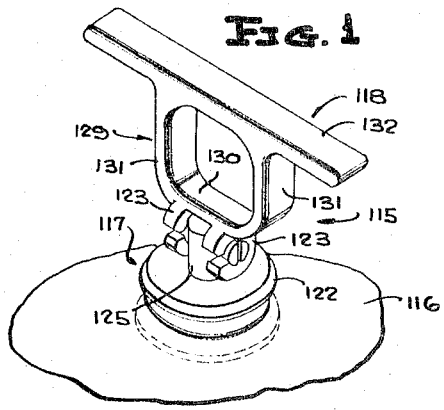
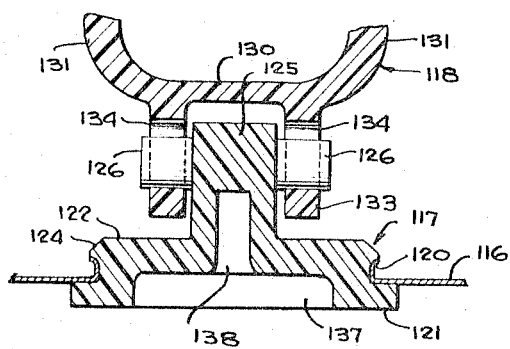
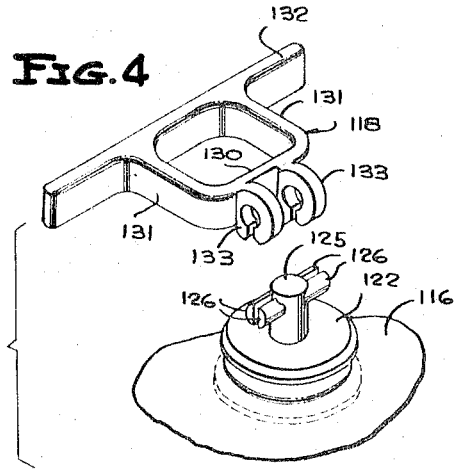
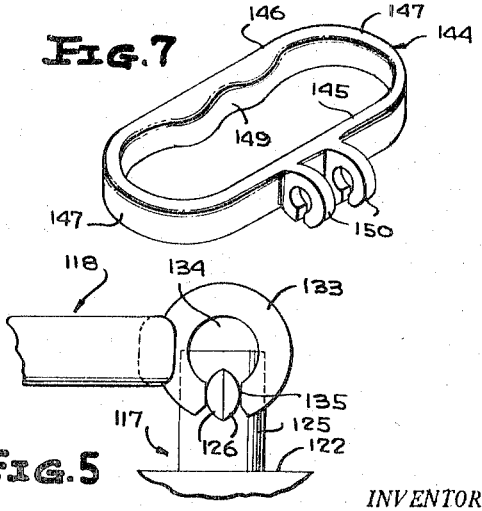
INVENTORS
JOHN HENCHERT &
HENRY E. FRANKENBERG
BY
ATTORNEYS

INVENTORS
JOHN HENCHERT &
HENRY E. FRANKENBERG

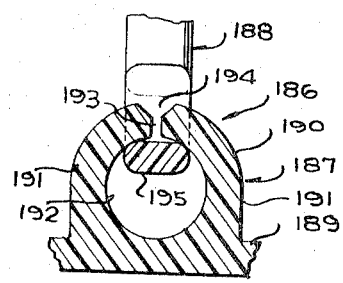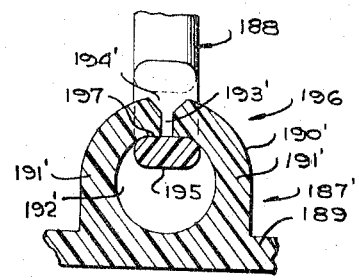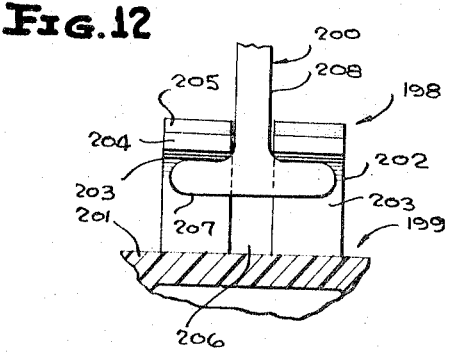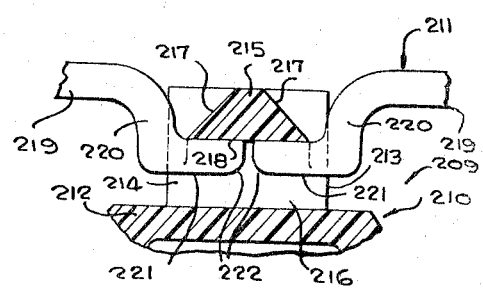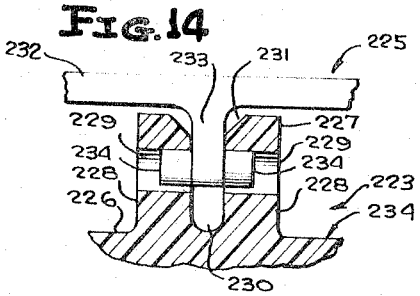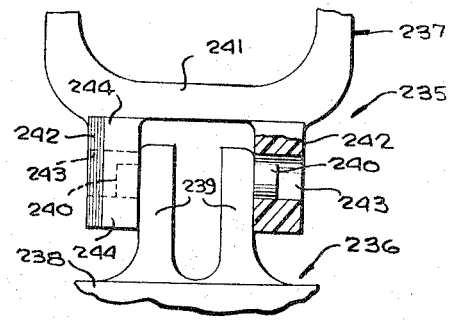

ial No. 99,567, filed March 30, 1961, and now
United States Patent Office 3,302,826
Patented Feb. 7, 1967

3,302,826
PLASTIC HANDLE AND CLEAT ATTACHMENT
FOR CONTAINERS
John Henchert, Oak Park, and Henry E. Frankenberg,
Berwyn, Ill., assignors to Continental Can Company,
Inc., New York, N.Y., a corporation of New York
Original application Mar. 30, 1961, Ser. No. 99,567, now
Patent No. 3,158,284. Divided and this application
May 20, 1964, Ser. No. 368,902
27 Claims. (Cl. 220—91)

This application constitutes a division of my copending commonly assigned application for U.S. Letters Patent, Ser
Patent No. 3,158,284.

This invention relates in general to new and useful improvements in handle constructions for containers, and more particularly relates to a novel plastic handle and cleat attachment for containers.

The primary object of this invention is to provide a novel handle and cleat assembly for containers, the cleat of the assembly being of a configuration to permit it to be readily snapped through an opening in a container wall and when so inserted in the opening, the cleat will interlock with the container wall to be retained in place therein and will close the opening to retain the sealed condition of the container wall, and the handle of the assembly being of a type wherein it may be readily engaged with the cleat after it has been passed through the container wall.

Another object of the invention is to provide a novel handle construction for use in conjunction with containers, the handle construction including a cleat and a handle pivotally connected to the cleat, the cleat being provided with an enlarged lower flange adapted to engage the inner side of a container wall with a measured portion of the cleat passing through an opening in the container wall and the cleat being interlocked with the container wall so that movement of the cleat into the container is resisted, the enlarged flange preventing withdrawal of the cleat outwardly through the container wall, and the handle being connected to the cleat by a hinge connection which is of a nature that permits the ready assembly of the handle with the cleat after the cleat has been passed through the container wall.

Yet another object of this invention is to provide a novel cleat and handle assembly which includes a cross bar and a socket disposed in cooperating relation and permitting relative rotation between the handle and the cleat as well as the separation of the handle from the cleat when desired, and the cross bar and socket having cooperating interlocking portions preventing separation of the handle from the cleat when the handle is in an article-carrying position.

Another object of this invention is to provide a novel cleat and handle assembly wherein both the cleat and the handle are formed of a suitable plastic material, and the handle is pivotally connected to the cleat by a suitable hinge assembly which includes at least a portion of the handle or of the cleat which is deformable to permit the interengagement of components of the hinge assembly.

Still another object of this invention is to provide a novel cleat and handle construction which is of a two-piece arrangement with both the handle and cleat having components of a hinge to pivotally connect the handle to the cleat, and the hinge construction being of a nature which permits the ready assembling of the handle with the cleat.

A further object of this invention is to provide a novel cleat and handle construction wherein the cleat has an elongated socket portion with an entrance opening thereinto, and the handle has a bar portion which is generally of a rectangular cross-section and is movable into the socket portion through the entrance opening when the handle is disposed generally at right angles to the angle of force applied thereto in the use of the handle and cleat assembly, whereby when the assembly is being utilized, the width of the bar portion presented to the entrance opening is greatly in excess of the width of the entrance opening and withdrawal of the handle from the cleat under normal usage is prevented.

Still another object of the invention is to provide a novel handle and cleat assembly wherein the cleat assembly is provided with a pair of socket portions which are movable apart for the reception of oppositely directed pin or bar portions therein, and the socket portions are resilient whereby once the pin portions are engaged therein, the socket portions return to their normal positions and retain the pin or bar portions therein.

Yet another object of this invention is to provide a novel handle and cleat assembly wherein the cleat is provided with a socket portion and the handle includes a bar portion which is interrupted, and the handle being in the form of a loop which permits the movement of the ends of the bar portions apart to facilitate the movement of the two halves of the bar portion into opposite ends of the socket portion to facilitate the connection of the handle to the cleat.

A further object of this invention is to provide a novel handle and cleat assembly wherein the cleat is provided with a pair of pin portions each of which is formed of two parallel transversely spaced parts, wherein the transverse dimension of each pin portion may be momentarily reduced, and the handle is provided with a pair of socket portions which have entrance openings generally of a width equal to the transverse dimension of the associated pin portion, whereby the socket portion may be engaged with the pin portions only when the pin portions are compressed and the entrance openings of the socket portions are aligned with the minimum width dimensions of the pin portions.

Yet another object of this invention is to provide a novel cleat and handle assembly wherein the cleat is provided with a pair of spaced upstanding ears having pins extending in opposite directions therefrom, and the ears being movable towards one another to decrease the spacing between the remote ends of the pins, and the handle has a pair of spaced apart socket portions which are spaced apart a distance which permits the engagement of the pins into the socket portions when the ears are in their squeezed positions.

A still further object of the invention is to provide a novel handle and cleat assembly wherein the cleat includes a support having a pair of pins extending in opposite directions therefrom, and the support carries above the pin a wedge member, the handle being provided with a pair of spaced apart socket portions which are movable apart and which are adapted to be engaged with the wedge members for movement apart and into engagement over the ends of the pins.

With the above, and other objects in view that will hereinafter appear, the nature of the invention will be more clearly understood by reference to the following detailed description, the appended claims and the several views illustrated in the accompanying drawings.

In the drawings:

FIGURE 1 is a fragmentary perspective view of a first form of handle construction in accordance with this invention, and illustrates the components of the handle construction being connected together and a cleat thereof being connected to a container wall.

FIGURE 2 is an enlarged transverse vertical sectional view taken through the handle construction of FIGURE 1, and shows the specific details of the cleat thereof, the relationship of the cleat with respect to the container wall, and the relationship of the handle with respect to the cleat.

FIGURE 3 is an enlarged fragmentary longitudinal sectional view taken along line 3—3 of FIGURE 2, and shows further the relationship of the components of the handle construction with respect to each other and the relationship of the cleat of the handle construction with respect to the container wall.

FIGURE 4 is an exploded perspective view of the handle construction, and illustrates the handle separated from the cleat and the cleat remaining connected to the container wall.

FIGURE 5 is an enlarged fragmentary end elevational view, showing the handle in the process of being engaged with the cleat.

FIGURE 6 is a perspective view showing the details of a handle which may be substituted for the handle shown in FIGURE 4.

FIGURE 7 is a perspective view showing the details of still another form of handle which may be substituted for the handle of FIGURE 4.

FIGURE 10 is an enlarged fragmentary sectional view of a handle and cleat assembly, and shows a socket portion of a cleat receiving and engaging a bar portion of a handle in the carrying position thereof.

FIGURE 11 is an enlarged fragmentary sectional view similar to FIGURE 10, and shows smooth flat inner surfaces of a socket carried by the cleat in full face contact with an upper surface of a bar of a handle.

FIGURE 12 is an enlarged fragmentary vertical sectional view of another form of handle construction wherein the handle is of a T-shaped configuration and the socket portion of the cleat is divided to receive a smooth cross bar carried by the handle shank.

FIGURE 13 is an enlarged fragmentary vertical sectional view of another form of handle and cleat assembly with the handle being connected to the cleat and the cleat being secured to a container wall and wherein flat smooth contact is maintained between the handle and cleat connection in the carrying position thereof.

FIGURE 14 is an enlarged fragmentary vertical sectional view of another form of handle and cleat assembly, and illustrates oppositely directed pins or bars carried by the handle engaged in spaced sockets of the cleat.

FIGURE 15 is an enlarged fragmentary elevational view with a portion broken away, and shows a pair of supports carrying oppositely directed pins carried by the cleat engageable in spaced sockets carried by a handle.

FIGURE 16 is an enlarged fragmentary elevational view with a portion broken away and shows in section a modification of the cleat and handle construction of FIGURE 9.

Figure 8:
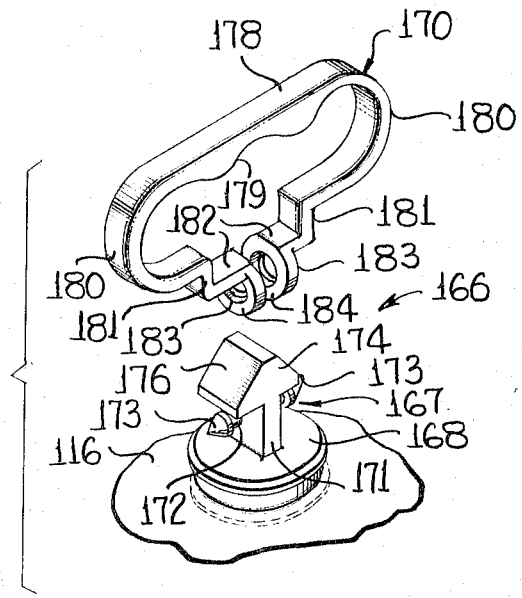
FIGURE 8 is an exploded perspective view of another handle construction in accordance with this invention, and illustrates a handle thereof separate from a cleat and the cleat being connected to a container wall.

Reference is now made to the drawings in detail, wherein a form of the invention is illustrated in FIGURES 1 through 5 of the drawings. The handle construction illustrated in these figures, is generally referred to by the reference numeral 115. The handle construction, alternately referred to as a cleat and handle assembly, is carried by a container wall 116 and includes a cleat, generally referred to by the numeral 117, and a handle, generally referred to by the numeral 118.

Reference is now made to FIGURE 3, wherein it will be seen that the container wall 116 has an opening 119 therethrough which is defined by an upwardly and slightly reversely turned collar 120. The cleat 117 includes a base flange 121 from which there projects a plug portion 122. The plug portion 122 is provided with an annular recess 123 (FIGURE 2) above the base portion 121 into which the collar 120 of the container wall 116 is seated when the cleat 117 is partially passed through the opening 119 and is anchored therein in sealed relation. The plug portion 122 is provided with a tapered peripheral portion 124 adjacent the upper end thereof to facilitate the forcing of the plug portion 122 through the opening 119 to seat the same therein as described heretofore. It is to be understood that the cleat 117 is formed of a suitable deformable and resilient material, such as a plastic including polyethylene. Thus, the cleat 117 may be readily assembled with the container wall 116.

The cleat 117 also includes a central support 125 which extends upwardly from the center of the plug portion 122. A pair of aligned pin or bar portions extend from opposite sides of the support 125 with each pin or bar portion being formed of a pair of parallel parts 126 which are disposed in transversely spaced relation on opposite sides of a vertical plane extending through the center of the support 125 and the center of the plug portion 122.

The handle 118 is in part defined by a continuous loop 129 which includes a lower pin or bar portion 130, a pair of upstanding portions 131, and an upper bar portion 132. The upper bar portion 132 is elongated as compared to the lower bar portion 130 and projects beyond the upstanding portions 131. Thus, the handle 118 is generally of a T-shaped configuration with the shank being relatively wide and defined by portions of the loop 129.

The handle 118 also includes a pair of spaced socket-forming members 133 which are formed integral with the lower bar portion 130 and depend downwardly therefrom in spaced parallel relation. Each of the socket-forming portions or members 133 is of a generally C-shaped configuration, as is shown best in FIGURE 2, and has a bore 134 therethrough. The bores 134 of the two socket-forming members 133 are in axial alignment. Each of the socket-forming members 133 has an entrance opening 135 opening into the bore 134 thereof. The entrance opening 135 of each of the members 133 has a flared mouth defined by flared opposed surface portions 136.

When it is desired to engage the handle 118 on the cleat 117, after the cleat 117 has been inserted in the opening 119 of the container wall 116, the handle 118 is disposed generally parallel to the top of the plug portion 122, as is best shown in FIGURE 5. Then, with the entrance openings 135 of the socket-forming members 133 aligned with the pin or bar portions 126, the handle 118 is forced downwardly towards the cleat 117. The surfaces 136 of the socket-forming members 133 engage the parts or portions 126 and urge the parts 126 together, as is clearly shown in FIGURE 5. The entrance opening 135 is substantially equal in width to the combined thicknesses of a pair of the portions 126 so that the portions 126 enter into the bores 134 of the two socket-forming members 133. The handle 118 is now firmly connected to the cleat 117 for swinging movement relative thereto, and there is no danger of the handle 118 being accidentally disengaged from the cleat 117 in the use of the handle construction 115.

Although the cleat 117 is formed of a readily deformable resilient material, it is preferable to internally relieve the cleat 117 to facilitate the necessary flexing thereof. Accordingly, the underside of the cleat 117 is provided with a cavity 137 (FIGURE 3) which extends through the base flange 121. In addition, the cavity 137 has an extension 138 which extends entirely through the plug portion 122 and up into the support 125.

Reference is now made to FIGURE 6 in particular, wherein there is illustrated a handle, generally referred to by the numeral 139. The handle 139 may be used in combination with the cleat 117 and is of a generally T-shaped configuration. The handle 139 includes a cross bar 140 and a stem or shank 141. The stem 141 terminates at its lower end in a narrow cross bar 142. The cross bar 142 carries a pair of socket-forming members 143 which are identical to the socket-forming members 133 and will not be described in further detail. The handle 139 is engaged with the cleat 117 in the same manner as described above with respect to the handle 118.

Another form of handle for use in conjunction with the cleat 117 is shown in FIGURE 7 of the drawings and this handle is generally referred to by the reference numeral 144. The handle 144 is in the form of a continuous loop and includes a lower bar portion 145 and an upper bar portion 146. The bar portions 145, 146 are connected together by generally semi-circular end portions 147. The upper bar portion 146 has the underside thereof configurated, as at 149, to form a grip portion. The lower bar portion 145 has formed integrally therewith and extending therefrom a pair of socket-forming members 150 which correspond to the socket-forming members 133 and 143. The socket-forming members 150 engage the parts 126 of the cleat 117 in the manner described above with respect to the handles 118 and 139. Further description of the socket-forming members 150 is believed to be unnecessary for a complete understanding of this invention.

Figure 9:
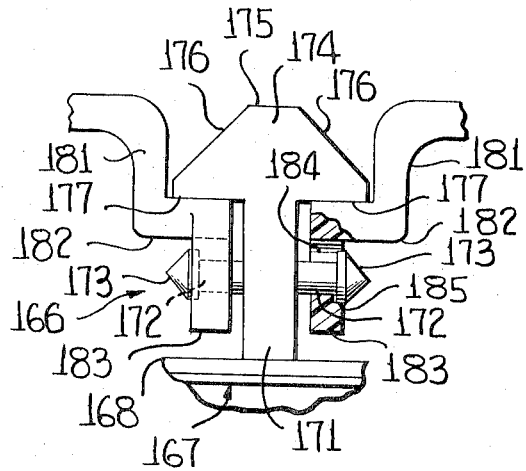
FIGURE 9 is an enlarged fragmentary elevational view showing the handle of FIGURE 8 connected to the cleat and the specific details of the connection.

A still further form of handle construction, generally referred to by the numeral 166, is illustrated in FIGURES 8 and 9 of the drawings. The handle construction 166 is carried by the container wall 116 and includes a cleat 167 which has a plug portion 168 extending through the container wall 116 and interlocked therewith in sealed relation in the manner hereinabove described with respect to the invention illustrated in FIGURES 1 through 5 of the drawings. The handle construction 166 also includes a handle 170 which is engaged with the cleat 167. The cleat 167, in addition to the aforementioned plug portion 168, includes an upstanding support 171 which has a pair of bars or pins 172 extending from opposite faces thereof in alignment. The pins or bars 172 are provided with enlarged generally conical pointed ends 173.

The support 171 terminates at its upper end in a wedge-shaped member 174. The wedge-shaped member 174 has a narrow top surface 175 and downwardly and outwardly sloping side surfaces 176. The member 174 also has flat undersurfaces 177 disposed on opposite sides of the support 171.

The handle 170 is formed of a relatively rigid material, such as plastic including polystyrene and is in the form of an interrupted loop, while the cleat 167 is formed of a relatively resilient deformable material, such as plastic including polyethylene. The handle 170 includes an upper bar portion 178 which is configurated on the underside thereof, as at 179, to form a finger-engaging grip portion. The bar portion 178 terminates at its ends in a pair of semi-circular end portions 180 which, in turn, terminate at their lower ends in vertical portions 181. A short lower bar portion 182 is integrally connected to each of the vertical portions 181, with the bar portions 182 being disposed in spaced aligned relation. A pair of socket forming members 183 extend downwardly from the bar portions 182 in spaced parallel relation. The socket-forming members 183 have aligned bores 184 therethrough. The outer end of each of the bores 184 is enlarged as at 185 to permit the socket-forming members 183 to lock behind the enlarged ends 185 and prevent releasing of the handle 170 under load.

The socket-forming members 183 of the handle 170 may move apart to facilitate the engagement of the handle 170 with the cleat 167. When it is desired to connect the handle 170 to the cleat 167, the handle 170 is moved downwardly with the socket-forming members 183 engaging the sloping side surfaces 176 of the member 174. As the handle 170 is moved downwardly, the socket-forming members 183 are spread apart until they clear the member 174, at which time they snap inwardly back to their normal position. Due to the pointed ends 173 on the pins 172, the pins 172 automatically enter respective ones of the bores 184 and the socket-forming members 183.

In the normal use of the handle construction 166, the upper surfaces of the lower bar portions 182 bear against the under surfaces 177 of the member 174 and the lifting force applied to the handle 170 is primarily transferred to the cleat 167 through the member 174, although a certain amount of the force is applied to the cleat 167 through the pins 172. Although the upper surfaces of the bar portions 182 do engage the members 174, the handle 170 may be pivoted about the pins 172 to inoperative positions whenever desired.

In FIGURE 10 of the drawings is illustrated another handle construction which is generally referred to by the numeral 186. The handle construction 186 includes a cleat, generally referred to by the numeral 187, which is identical to the cleats heretofore described, and a handle 188 which is of either a continuous loop configuration or a discontinuous configuration as the handle of FIGURES 1 through 5 of the drawings.

The cleat 187 has a base (unnumbered) of which only an upper part of a plug portion 189 is illustrated. The cleat 187 includes a socket portion 190 which extends upwardly from the top surface of the plug portion 189. The socket portion 190 is of a lesser width than the diameter of the plug portion 189 and has a length almost equal to the length of the plug portion (not shown). The socket portion 190 is formed by a pair of generally parallel, C-shaped cross-sectional members 191 which are disposed in opposed relation and define a bore 192 having a smooth surface throughout. The upper ends of the members 191 are spaced apart to define an entrance opening 193 which has a flared upper mouth 194. The handle 188 includes a lower bar portion 195 which corresponds to the bar portion 130 of the handle 118 of FIGURES 1 through 5 in the absence of the members 123. The transverse width of the bar portion 195 is less than the diameter of the bore 192 and is freely rotatable within this bore so that the handle 188 is mounted for pivotable movement relative to the cleat 189. An upper surface (unnumbered) of the bar 195 is relatively smooth and the width thereof is substantially greater than the entrance opening 193 while the thickness is approximately three times the size of the entrance opening 193.

In the assembling of the handle construction 186 of FIGURE 10, the handle is placed generally parallel to the container wall (not shown) and one of the edges of the bar portion 195 is engaged with the flared mouth 194 of the entrance opening 193. Downward pressure is them exerted on the bar portion 195 with the result that the members 191 are spread apart to increase the width of the entrance opening 193 and to permit the movement of the bar portion 195 therethrough. Once the bar portion 195 is passed into the socket portion 187, although the entrance opening 193 is disposed uppermost, the bar portion 195 will not pull back out through the entrance opening 193 due to the width thereof and the bearing contact and interlock between the bar portion 195 and the terminal end portions (unnumbered) of the members 191.

Reference is now made to FIGURE 11 in particular, wherein there is illustrated a handle construction which is generally referred to by the numeral 196. The handle construction 196 includes the handle 188 of FIGURE 10, but utilizes a slightly modified form of cleat which is generally referred to by the numeral 187'. The cleat 187' is identical to the cleat 187 for the most part, and includes a plug portion 189' having a socket portion 190' projecting upwardly therefrom. The socket portion 190' is formed of a pair of opposed, generally parallel C-shaped members 191' which define a bore 192'. The bore 192' differs from the bore 192 of FIGURE 10 in that in lieu of being circular it has a flattened upper portion, referred to by the numeral 197, on each side of the entrance opening 193' thereof. The flattened surfaces defined by the flattened upper portions 197 provide seats for the flat upper surface of the bar portion 195 of the handle 188 of FIGURE 11.

FIGURE 12 shows a handle construction, generally referred to by the numeral 198 which includes a cleat 199 and a handle 200. For the most part, the cleat 199 is identical to the cleats heretofore described and includes the same type of base construction as that of the cleat 117. However, only the plug portion 201 of the cleat base construction is shown.

The cleat 199 has a socket portion 202 of which only one-half is shown. The socket portion 202 is transversely divided into two longitudinal halves, and is defined by four generally C-shaped members 203 of which only two longitudinally aligned members 203 are shown. The members 203, when combined with the other two of the members 203 not illustrated, define an entrance opening 204 having a flared mouth 205. Due to the spacing of the members 203, a transverse slot 206 is formed.

The handle 200 includes a lower bar portion 207 carried by a depending shank 208 which is substantially identical to the stem or shank 141 of FIGURE 6. The C-shaped members 203 and the bar portion 207 have smooth opposed surfaces (unnumbered).

FIGURE 13 corresponds to FIGURE 9, and shows a modified handle construction which is generally referred to by the reference numeral 209. The handle construction 209 includes a cleat, generally referred to by the numeral 210, and a handle, generally referred to by the numeral 211.

The cleat 210 has a base construction identical with that of the cleats heretofore described, although only an upper part of a plug portion 212 thereof is illustrated. The cleat 210 has a socket portion 213 extending upwardly from the upper surface of the plug portion 212. The socket portion 213 is defined by two generally parallel upstanding members 214, of which only one is illustrated. The upstanding members 214 are connected together by an intermediate bridge portion 215 to define a bore 216 having an axis disposed generally parallel to the upper surface of the plug portion 212. The bridge member 215 is of a wedge-shaped cross-section similar to the member 174 of FIGURE 9, and has opposite downwardly sloping surfaces 217. The bridge member 215 has a smooth under surface 218.

The handle 211 can either be of a continuous loop configuration or of a generally T-shaped configuration (neither of which is illustrated) and is preferably of an open loop construction which has a pair of semi-circular end portions 219 which are connected together at the upper ends thereof by a bar portion (not shown) and which terminate at their lower ends in generally vertical portions 220. The vertical portions 220 are, in turn, curved inwardly and terminate at their lower ends in a pair of opposed lower bar portions 221. The lower bar portions 221 have rounded lower corners 222 to facilitate the snapping of the handle down around the bridge member 215 in a manner heretofore described in the consideration of FIGURE 9 into interlocked engagement with the cleat 210 in the manner illustrated in FIGURE 13.

It is to be particularly noted that the upper surfaces of the lower bar portions 211 which are smooth provide for a smooth face-to-face contact between the bar portions 221 and the under surface 218 of the bridge 215.

In FIGURE 14 there is illustrated a handle construction which is generally referred to by the numeral 223. The handle construction 223 includes a cleat, generally referred to by the numeral 224, and a handle, generally referred to by the numeral 225.

For the most part, the cleat 224 corresponds to the cleats heretofore described and includes a base of which only an upper part of a plug portion 226 is illustrated. The plug portion 226 carries a socket portion 227 which is formed of a pair of ears 228 which are integrally connected to the plug portion 226 and are disposed generally in spaced parallel relation. The ears 228 have aligned bores 229 which extend generally parallel to the upper surface of the plug portion 226. The spacing apart of the ears 228 defines a vertical slot 230 having an enlarged entrance mouth 231 which is formed by the beveling of the upper inner surfaces of the ears 228.

The handle 225 has an upper portion which includes a lower bar portion 232 corresponding to the lower bar portion 130 of the handle 118. A support 233 depends downwardly from this lower bar portion 232. A pair of aligned pins 234 which are received in respective ones of the bores 229 are provided. It will be seen that the pins 234 are smooth and that the bores 229 are likewise smooth. This construction similarly provides for a smooth face-to-face contact between the pins 234 and the surfaces defining the bores 229.

Reference is now made to FIGURE 15 in detail wherein there is illustrated a handle construction, generally referred to by the numeral 235. The handle construction 235 includes a cleat 236 and a handle 237 which are each substantially identical for the purposes of this disclosure to the cleats and handles heretofore described.

The cleat 236 has a base of which only an upper part of a plug portion 238 is illustrated. A pair of ears 239 extend upwardly from the top surface of the plug portion 238 in spaced parallel relation. An outwardly directed pin 240 is carried by each of the ears 239.

The handle 237 has an upper portion which is provided with a lower bar portion 241, corresponding to the bar portion 130 of the handle 118 of FIGURE 1. The lower bar portion 241 carries a pair of identical socket-forming members 242 which are formed integral therewith and depend therefrom in spaced parallel relation. The two socket-forming members 242 have aligned bores 243 therethrough for receiving the pins 240. The socket forming members 242 have opposed sloping edge surfaces 244 to facilitate the camming of the ears 239 together so that the pins 240 may be received in the bores 243. It is to be noted that the pins 240 and the bores 243 have smooth surfaces throughout to facilitate pivoting movement of the handle 237.

In FIGURE 16 of the drawings, there is illustrated a handle construction which corresponds generally to the handle construction of FIGURE 9, the handle construction of FIGURE 16 being generally referred to by the numeral 245. The handle construction 245 includes a cleat 246 and a handle 247, each of which are identical for the purposes of this invention to the cleats and handles heretofore described.

The cleat 246 includes a base of which only a plug portion 248 thereof is illustrated. The cleat 246 has an upstanding support 249 which is formed integral with and projects upwardly from the upper surface of the plug portion 248. A pair of pins 250 extend from the central portion of the support 249 on opposite sides thereof, the pins being in alignment and having pointed generally conical outer ends 251.

The support 249 terminates at its upper end in a wedge-shaped member 252. The wedge-shaped member 252 has a narrow top surface 253 and outwardly and downwardly sloping side surfaces 254. The member 252 also has flat under surfaces 255 disposed on opposite sides of the support 249.

The handle 247 includes an upper portion (not shown) and a lower portion including short vertical portions 256 which correspond to the vertical portions 181 of the handle 170. A short lower bar portion 257 is integrally connected to each of the vertical portions 256, the bar portions 257 being disposed in spaced aligned relation. A pair of socket-forming members extend downwardly from the bar portions 257, the socket-forming members being referred to by the numeral 258. The socket-forming members 258 have aligned bores 259 therethrough for receiving the pins 250.

It is to be noted that the pins 250 and the bores 259 have smooth walls similar to the corresponding interlocked elements illustrated in FIGURES 10 through 15 of the drawings.

From the foregoing, it will be seen that novel and advantageous provision has been made for carrying out the desired end. However, attention is again directed to the fact that variations may be made in the example handle construction disclosed herein without departing from the spirit and scope of the invention as defined in the appended claims.

We claim:

1. A handle construction for containers comprising a one-piece plastic cleat member and a handle member, said cleat member including first and second axially opposite terminal portions, said first terminal portion being a generally cylindrical plug portion, said plug portion including means for sealingly securing said plug portion in an aperture of a container wall, and a hinge connection between said handle member and the second terminal portion of said cleat member, said hinge connection including an opening in one of said members and a connecting portion on the other of said members received in the opening, said hinge connection including means temporarily deformable to facilitate the connecting together of the handle and cleat members and wedge means for temporarily deforming the deformable means.

2. The handle construction as defined in claim 1 wherein said deformable means forms a part of said connecting portion.

3. The handle construction as defined in claim 1 wherein said deformable means forms a part of said member provided with said opening.

4. The handle construction as defined in claim 1 wherein said deformable means forms a part of said connecting portion and said part includes bifurcated pin portions.

5. The handle construction as defined in claim 1 wherein said deformable means forms a part of said connecting portion, said connecting portion including a support carried by the second terminal portion of said cleat member, said deformable means being carried by said support at an upper portion thereof and said deformable means being a pair of oppositely disposed bifurcated pin portions.

6. The handle construction as defined in claim 5 wherein the opening in said other member is generally C-shaped and portions of said other member defining said opening includes said wedge means.

7. The handle construction as defined in claim 6 wherein said portions of said other member are opposed wedge surfaces defining an entrance opening converging towards said first mentioned opening.

8. A handle construction for containers of the type having an apertured wall, said handle construction comprising a cleat and a handle, said cleat including a base portion, an elongated sleeve of resilient material connected to said base portion, said sleeve having a longitudinally extending narrow entrance opening remote from said base portion, and said handle including a flattened bar extending through at least a major portion of said sleeve, and being freely rotatable therein, said entrance opening having a flared entrance portion to facilitate spreading apart of portions of said sleeve on opposite sides of said entrance opening and permit the edgewise movement of said bar therethrough.

9. A handle construction for containers of the type having an apertured wall, said handle construction comprising a cleat and a handle, said cleat including a base portion, an elongated sleeve of resilient material connected to said base portion, said sleeve having a longitudinally extending narrow entrance opening remote from said base portion, said entrance opening having a flared entrance portion to facilitate spreading apart of portions of said sleeve on opposite sides of said entrance opening and permit the edgewise movement of said bar therethrough, and said handle including a continuous loop portion of which a flattened bar forms a lowermost part, said bar extending entirely through said sleeve and being freely rotatable therein.

10. The handle construction of claim 9 wherein said loop portion has an upper part with a lower finger gripping surface.

11. The handle construction of claim 9 wherein said loop portion has an upper part with a lower finger gripping surface and said bar is downwardly offset.

12. The handle construction of claim 9 wherein said loop portion has an upper bar having end extensions extending beyond said loop portion, said upper bar and said bar end extensions combining to form a grip.

13. The handle construction of claim 8 wherein said handle is generally T-shaped and said bar is disposed at the bottom of the stem portion of the T-shaped handle.

14. The handle construction of claim 8 wherein said handle is generally T-shaped and said bar is disposed at the bottom of the stem portion of the T-shaped handle, said stem portion being relatively narrow and connected to the center of said bar, and said sleeve has a transverse groove receiving said stem portion allowing swinging of said stem portion.

15. A handle construction for containers of the type having an apertured wall, said handle construction comprising a cleat and a handle, said cleat including a base portion, an elongated sleeve connected to said base portion, said sleeve having an upper portion of a wedge shaped cross section and including downwardly flaring upper surfaces terminating at the lower ends thereof generally at opposite ends of said sleeve, said handle including two lower bar portions disposed in alignment with opposed ends in closely spaced relation, resilient means supporting said bar portions for separation by said sleeve edge portion to connect said handle to said sleeve.

16. The handle construction of claim 15 wherein said loop portion has an upper part with a lower finger gripping surface and said bar is downwardly offset.

17. A handle construction for containers of the type having an apertured wall, said handle construction comprising a cleat and a handle, said cleat being formed of a deformable material and including a base portion and two spaced aligned sleeve portions extending from said base portion, said handle including a depending shank portion having aligned pin portions projecting from opposite surfaces thereof and received in said sleeve portions to pivotally mount said handle.

18. The handle construction of claim 17 wherein said sleeve portions have downwardly sloping opposed upper and inner cam surfaces for engagement by said pin portions to spread said sleeve portions apart and facilitate movement of said pin portions into said sleeve portions.

19. A handle construction for containers of the type having an apertured wall, said handle construction comprising a cleat and a handle, said cleat including a plug portion extending through said apertured wall and sealing the aperture therein, and a hinge connection between said handle and said cleat providing for swinging movement of said handle between a position resting against said wall and a position normal to said wall, said hinge connection including a pair of aligned oppositely extending pin portions spaced above said plug portion and said handle including a pair of depending socket portions receiving said pin portions.

20. The handle construction of claim 19 wherein each of said pin portions is formed of two axially parallel and transversely spaced ports adapted to be moved together to temporarily reduce a transverse dimension of each pin portion, and each socket portion has an entrance slot for receiving the reduced transverse dimension of the associated pin portion to facilitate engagement of said pin portions in said socket portions.

21. The handle construction of claim 19 wherein each of said pin portions is formed of two axially parallel and transversely spaced parts adapted to be moved together to temporarily reduce a transverse dimension of each pin portion, and each socket portion has an entrance slot for receiving the reduced transverse dimension of the associated pin portion to facilitate engagement of said pin portions in said socket portions, said entrance slots being disposed generally normal to the plane of said handle.

22. A handle construction for containers of the type having an apertured wall, said handle construction comprising a cleat and a handle, said cleat including a base having a support projecting therefrom, a pair of aligned oppositely extending pin portions projecting from said support in spaced relation to said base, and said handle having socket portions receiving said pin portions to pivotally mount said handle, said pin portions being formed of two axially parallel transversely spaced parts adapted to be moved together to temporarily reduce a transverse dimension of each pin portion, and each socket portion having an entrance slot for receiving the reduced transverse dimension of the associated pin portion to facilitate engagement of said pin portions in said socket portions.

23. A handle construction for containers of the type having an apertured wall, said handle construction comprising a cleat and a handle, said cleat including a base having a support projecting therefrom, a pair of aligned oppositely extending pin portions projecting from said support in spaced relation to said base, and said handle having socket portions receiving said pin portions to pivotally mount said handle, said pin portions being formed of two axially parallel transversely spaced parts adapted to be moved together to temporarily reduce a transverse dimension of each pin portion, and each socket portion having an entrance slot for receiving the reduced transverse dimension of the associated pin portion to facilitate engagement of said pin portions in said socket portions, said entrance slots being disposed generally normal to the plane of said handle.

24. The handle construction of claim 23 wherein said handle includes a closed loop having a lower bar portion, and said socket portions depend from said bar portion.

25. The handle construction of claim 23 wherein said handle includes a closed loop having a lower bar portion, and said socket portions depend from said bar portion, said loop having an upper bar portion with ends extending beyond said loop wherein said handle is of a generally T-shape.

26. The handle construction of claim 23 wherein said handle includes a closed loop having a lower bar portion, and said socket portions depend from said bar portion, said loop being adapted to receive one's hand and including an upper bar portion having a contoured gripping surface on the underside thereof.

27. The handle construction of claim 23 wherein said handle is generally T-shaped and includes an upper cross bar and a shank, said socket portions being connected to said shank at the end thereof remote from said cross bar.

References Cited by the Examiner

UNITED STATES PATENTS

| | | | |
|---|---|---|---|
| 2,177,554 | 10/1939 | Stiff | 16—127 |
| 2,460,488 | 2/1949 | Brunetti | 220—31 |
| 2,637,460 | 5/1953 | Yates | 220—31 |
| 2,722,137 | 11/1955 | Russell | 16—125 |
| 2,797,840 | 7/1957 | Gibbs | 220—31 |
| 2,960,254 | 11/1960 | Kiba | 220—31 |
| 3,005,571 | 10/1961 | Hall | 220—31 |
| 3,093,257 | 6/1963 | Miller | 220—91 |

FOREIGN PATENTS

| | | |
|---|---|---|
| 559,369 | 8/1957 | Belgium. |
| 631,678 | 11/1961 | Canada. |

THERON E. CONDON, *Primary Examiner.*

RAPHAEL H. SCHWARTZ, *Examiner.*